US012298953B1

(12) United States Patent
Noce et al.

(10) Patent No.: US 12,298,953 B1
(45) Date of Patent: May 13, 2025

(54) HYBRID MACHINE LEARNING MODEL TRAINING AND DEPLOYMENT TO MOBILE EDGE DEVICES

(71) Applicant: Dell Products L.P., Round Rock, TX (US)

(72) Inventors: Julia Drummond Noce, Rio de Janeiro (BR); Paulo Abelha Ferreira, Rio de Janeiro (BR); Isabella Costa Maia, São Paulo (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/430,223

(22) Filed: Feb. 1, 2024

(51) Int. Cl.
  *G06F 16/22* (2019.01)
  *G06F 16/29* (2019.01)
(52) U.S. Cl.
  CPC .......... *G06F 16/2246* (2019.01); *G06F 16/29* (2019.01)
(58) Field of Classification Search
  None
  See application file for complete search history.

(56) References Cited

U.S. PATENT DOCUMENTS

| 2009/0022388 | A1* | 1/2009 | Dioguardi | G06T 7/0012 382/133 |
|---|---|---|---|---|
| 2021/0117841 | A1* | 4/2021 | Rhodes | G06N 7/01 |
| 2021/0295408 | A1* | 9/2021 | Hayden | G06F 16/24578 |
| 2022/0245904 | A1* | 8/2022 | Saxena | G06F 11/3419 |
| 2022/0400162 | A1* | 12/2022 | Hu | G06N 20/20 |
| 2023/0068386 | A1* | 3/2023 | Akdeniz | G06N 3/084 |
| 2024/0126836 | A1* | 4/2024 | Gao | G06F 18/21 |

* cited by examiner

*Primary Examiner* — Kannan Shanmugasundaram
(74) *Attorney, Agent, or Firm* — Krishnendu Gupta; Deepika Bhayana; Derek Lam

(57) ABSTRACT

Techniques are disclosed for hybrid machine learning model training and deployment to mobile edge devices. An example system includes a processor communicatively coupled to a memory and configured to execute instructions. Example instructions include receiving geolocation data from mobile edge devices; using the geolocation data to index the mobile edge devices into sub-regions; ranking associated machine learning (ML) models in the sub-regions based on performance metrics; and using a current geolocation of a particular mobile edge device within a given sub-region to serve a selected ML model to the particular device, wherein the ML model to serve is selected based on the performance metrics of the selected ML model within the given sub-region.

20 Claims, 8 Drawing Sheets

HYBRID MACHINE LEARNING MODEL TRAINING AND DEPLOYMENT TO MOBILE EDGE DEVICES

FIELD

Example embodiments generally relate to machine learning model management in a distributed edge network. More specifically, at least some embodiments relate to systems, hardware, software, computer-readable media, and methods for machine learning model training and deployment in a distributed network of mobile edge devices.

BACKGROUND

In the realm of distributed computing, edge computing has emerged as a paradigm that brings computation and data storage closer to the location where it is needed, to improve response times and save bandwidth. The concept involves a network of remote systems, referred to as edge devices, which can include anything from IoT devices to mobile phones and autonomous vehicles. These devices often collect and process vast amounts of data, necessitating the use of machine learning (ML) models to make timely and accurate decisions.

Conventional centralized machine learning approaches face challenges such as high latency, bandwidth constraints, and privacy concerns. As a result, distributed machine learning techniques, such as Federated Learning (FL) and Gossip Learning (GL), have been developed.

FL involves training algorithms across multiple distributed edge devices holding local data samples, without exchanging them, while GL is a fully decentralized and distributed approach where the learning process is spread across the network without a central coordinator. Both methods aim to leverage the distributed nature of edge devices to enhance learning efficiency and model performance.

SUMMARY

Techniques are disclosed for hybrid machine learning model training and deployment to mobile edge devices.

In one embodiment, a system includes a memory including instructions; and a processor communicatively coupled to the memory and configured to execute the instructions. The instructions include: receiving geolocation data from mobile edge devices; using the geolocation data to index the mobile edge devices into sub-regions; ranking associated machine learning (ML) models in the sub-regions based on performance metrics; and using a current geolocation of a particular mobile edge device within a given sub-region to serve a selected ML model to the particular device, wherein the ML model to serve is selected based on the performance metrics of the selected ML model within the given sub-region.

In some embodiments, a central server is equipped with the memory and the processor, and the central server and the mobile edge devices are configured to operate in a hybrid Federated Learning and Gossip Learning environment that enables continuous clustered training and centralized orchestration of model deployment. The mobile edge devices can be configured to request and receive ML models from the central server or directly from peer devices in the hybrid Federated Learning and Gossip Learning environment based on network connectivity and restrictions. The sub-regions can be determined using a quad-tree data structure. The ML models can be ranked using one or more heapsort data structures associated with the sub-regions. The instructions can further include updating the quad-tree data structure periodically based on the geolocation data; constructing and updating the heapsort data structures with new ML models and corresponding performance metrics of the new ML models; and providing a list of high-performing ML models for a route traversed by a particular mobile edge device, where the ML models are included in the list based on the performance metrics of the ML models in the sub-regions of the route. The instructions can further include computing a centroid of geolocations for the mobile edge devices. The mobile edge devices can be indexed using the centroid and the quad-tree data structure if a standard deviation of the geolocations is below a predefined threshold. The performance metrics can include at least validation accuracy of the machine learning models. The instructions can further include providing a weighted merge of the ML models associated with the sub-regions to facilitate smooth transitions between ML models for a particular mobile edge device as the device traverses different sub-regions. The mobile edge devices can be configured to perform Gossip Learning by exchanging and updating ML models with peer devices within a same sub-region. The mobile edge devices can be configured to perform weighted averaging of the ML models based on current geolocations of the devices relative to centers of the sub-regions that the devices traverse. The mobile edge devices include self-driving vehicles configured to collect heterogeneous data and to leverage continuous model serving and efficient deployment of ML models so as to adapt to varying conditions along a route.

Other example embodiments include, without limitation, apparatus, systems, methods, and computer program products comprising processor-readable storage media.

Other aspects will be apparent from the following detailed description and the amended claims.

BRIEF DESCRIPTION OF THE DRAWINGS

The foregoing summary, as well as the following detailed description of exemplary embodiments, will be better understood when read in conjunction with the appended drawings. For purposes of illustrating the invention, the drawings illustrate embodiments that are presently preferred. It will be appreciated, however, that the invention is not limited to the precise arrangements and instrumentalities shown.

In the drawings.

DETAILED DESCRIPTION

Figure 1A:
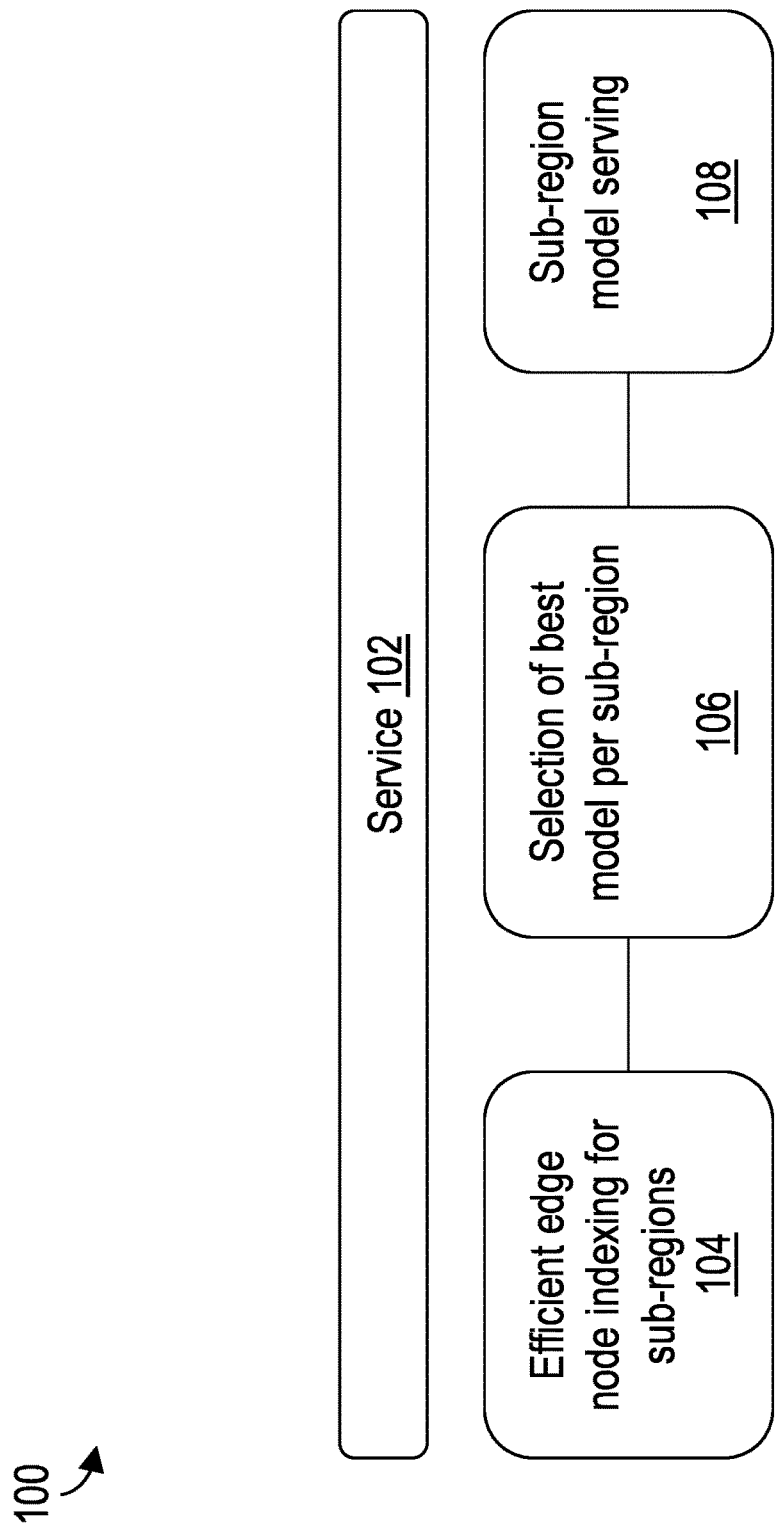
FIGS. 1A and 1B disclose aspects of an example hybrid system, in accordance with illustrative embodiments.

Example embodiments generally relate to machine learning model management in a distributed edge network. More specifically, at least some embodiments relate to systems, hardware, software, computer-readable media, and methods for machine learning model training and deployment in a distributed network of mobile edge devices.

Disclosed herein are techniques for machine learning (ML) model training and deployment to mobile edge devices. Example embodiments are designed to operate in a hybrid Federated Learning and Gossip Learning environment, enabling continuous clustered training and centralized orchestration of model deployment. This hybrid approach leverages the low bandwidth requirements of Gossip Learning and the centralized model deployment coordination of Federated Learning, resulting in a robust and scalable system for ML model management in mobile edge networks.

Conventional approaches like Federated Learning and Gossip Learning have been employed to address the challenges of model training and deployment in such networks. Federated Learning typically relies on a central server to orchestrate the learning process, aggregating model updates from edge devices. This approach, while effective in certain scenarios, can be hampered by network restrictions and may not be suitable for highly mobile or geographically dispersed devices. Gossip Learning, on the other hand, allows for a decentralized learning process without a central server, where models are updated and exchanged between peer devices. However, this method can suffer from inefficiencies in model performance due to the lack of centralized coordination.

Example embodiments address these challenges using a hybrid system that combines the strengths of both Federated Learning and Gossip Learning. One implementation utilizes a central server equipped with a processor and memory to receive geolocation data from mobile edge devices and index these devices into sub-regions using a quad-tree data structure. This quad-tree enables efficient management of the geographical distribution of edge devices and associated machine learning models. Additionally, a heapsort data structure is employed to rank the ML models within each sub-region based on performance metrics, such as validation accuracy.

In example embodiments, the central server is configured to periodically update the quad-tree and heapsort data structures with new geolocation data and ML models, ensuring that the system remains current with the dynamic environment of mobile edge devices. The central server also provides a list of high-performing ML models for predefined routes traversed by these devices, facilitating efficient model deployment.

In example embodiments, mobile edge devices within the present system are capable of performing Gossip Learning, exchanging and updating ML models with peer devices in the same sub-region. Advantageously, this gossip learning allows for continuous model serving and training, which is helpful for applications such as self-driving vehicles that benefit from adaptation to varying conditions along a route. The devices can request and receive ML models from the central server or directly from peer devices, depending on network connectivity and restrictions.

Example embodiments of the mobile edge devices are configured to perform weighted averaging of ML models based on their current geolocations relative to the centers of the sub-regions they traverse. Advantageously, this feature ensures smooth transitions between ML models as a device moves through different sub-regions, providing a balanced mix of models that are tailored to the specific data distributions of each area.

The disclosed techniques improve situations that benefit from having a Machine Learning model to be trained and deployed to a massive number of nodes. The training and deployment of prediction models could be offered as a service (-aaS) by enterprises to large participants and customers in this domain, one example being self-driving connected vehicles. Such domains generally include mobile edge devices gathering large amounts of heterogeneous data while under possible network restriction when moving through certain areas.

The present hybrid solution addresses the task of providing training and deployment of ML models to many edge nodes that are geographically dispersed while keeping the data where it is generated. In addition to being dispersed, these edge nodes move across vast distances into regions that are possibly related to different data stream distributions (for example, different geographical regions). Advantageously, the present solution helps ensure the best possible model for each region as an edge node traverses it.

As discussed herein, the disclosed techniques address numerous technical problems, including but not limited to the following: (1) continuous model serving; and (2) efficient deployment of models to mobile edge nodes.

Some implementations extend the Gossip Learning paradigm to encompass efficient deployment through a quad-tree data structure while enabling continuous training. More particularly, example embodiments leverage Gossip Learning to offer continuous clustered training of different ML models while maintaining low bandwidth requirements. Reciprocally, example embodiments also leverage Federated Learning to have centralized orchestration of model deployment.

Example embodiments leverage a Gossip Learning environment, where edge nodes are periodically clustered according to geographical position. When an edge node decides to follow a long route (where "long" can be a pre-defined threshold) the edge node will send that route to the central server, which is configured to compute the list of best models corresponding to the crossed trajectory to be deployed at the route's beginning. That is, as the node traverses the route, example embodiments construct a model from the list of best models by combining the two whose associated regions are closest to the given current location. Some implementations leverage enhanced data structures such as a quad-tree configured to store the geographical clusters, along with a heapsort of models for that region sorted by a given performance metric (for example, validation accuracy).

Advantageously, the disclosed techniques provide numerous technical solutions, including but not limited to the following:
 1. Extension of Gossip Learning to deal with continuous model serving for nodes traversing routes;
 2. Efficient deployment of models to mobile edge nodes via a combination of efficient data structures; and
 3. Smooth Gossip Learning training through route traversing for mobile edge devices.

It should be noted that terms used herein, such as "best" and the like only represent objectives to move towards an improved state, rather than necessarily obtaining ideal results. As one example, the "best" model refers to choosing an acceptable or appropriate model from those obtained based on various performance metrics as discussed in further detail herein, not necessarily the top-performing model that can be achieved by other techniques and/or from among locations that are impractical.

Specific embodiments will now be described in detail with reference to the accompanying figures. In the following detailed description of example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A. Context for an Example Embodiment

The following is a discussion of a context for example embodiments. This discussion is not intended to limit the scope of the invention, or the applicability of the embodiments, in any way.

A.1. Gossip Learning

Gossip learning is an asynchronous protocol for learning models from fully distributed data without central control.

First, the node initializes a local model and its age. This model is then periodically sent to another node in the network, which merges the received model with the node's local model by averaging the model parameters. The combined model is trained with local data and sent to another node, restarting the model merge and training process again. The models take random walks in the network and are updated when visiting a node. The possible update methods are the same as in the case of Federated Learning, and compression can be applied as well.

| Algorithm 1: Gossip Learning Pseudocode |
| --- |
| 1    function main |
| 2        currentModel ←initModel( ) |
| 3        lastModel ←currentModel |
| 4        loop |
| 5            Wait(Δ) |
| 6            p ←randomPeer( ) |
| 7            send(p, currentModel) |
| 8        end loop |
| 9    end function |
| 10   function onModelReceived(m) |
| 11       currentModel ←update(merge(m, lastModel)) |
| 12       lastModel ←m |
| 13   end function |

Algorithm 1 describes pseudocode for a Gossip Learning method. The main loop is executed at each edge node: a random peer is chosen among the other participants in the cluster and the current model is sent to another node. When the node receives the new model, the node merges the new model with the last model previously received and updates the resulting model by performing local training. The resulting model is then stored locally for prediction and for gossiping with peers until a new model is received and the process is repeated.

The merge method can be diverse. Some implementations of the present hybrid solution are configured to average the model parameters. In further embodiments, the disclosed techniques use a lightweight sampling method as a compression mechanism. For example, instead of conventional Gossip Learning that involves sending the full model to the neighbor, in example embodiments a node sends only a subset of parameters.

In higher compression settings, gossip learning can outperform federated learning. However, if download traffic is considered to have essentially no influence on a particular comparison, Federated Learning is more favorable.

A.2. Federated Learning

Federated Learning (FL) is a machine learning technique where the goal is to train a centralized model while the training data remains distributed on many client nodes. Usually, the network connections and the processing power of such client nodes are unreliable and slow. Generally, client nodes can collaboratively learn a shared machine learning model (such as a deep neural network) while keeping the training data private on the client's device, so the model can be learned without storing a huge amount of data in the cloud (or in the central node). Each of the client nodes in the federation receives a machine learning model from a central server and trains the model locally, sending only the gradient's updates back to the central node. This central node, in turn, performs the aggregation of updates and backpropagate the updates to the central model, sending this new version to each of the client nodes. This process is repeated iteratively until the global model reaches convergence. Every process with many data-generating nodes can benefit from such an approach, and these examples are countless in the mobile computing world we live in nowadays.

In the context of Federated Learning, a central node can be any machine with reasonable computational power that receives the updates from the client nodes and aggregates these updates on the shared model. A client node is any device or machine that contains data that will be used to train the machine learning model. Examples of client nodes include, but are not limited to, the following: connected cars, mobile phones, storage systems, network routers, and the like.

A.3. Technical Problems

The disclosed techniques address a scenario where there are multiple edge nodes, such as self-driving vehicles with network connections that travel along different routes that diverge in weather, traffic, and geographic conditions. Among the data diversity and network conditions in this scenario, the choice of the best models to be deployed in the edge node can be helpful to decide the best possible route that this self-driving vehicle can travel. The following sections provide further detail on particular technical challenges addressed by the present solution:

A.3.1. Continuous Model Serving

Continuous model serving is fundamental for real-world applications dealing with highly mobile edge nodes, since pre-trained models cannot adequately deal with non-stationary data distribution. As the data diverges over time continuously, it is desirable that the node keeps its current model up to date with the best data for the given region that the node is currently in.

A.3.2. Efficient Deployment and Training of Models in Gossip Learning Along Routes In a self-driving vehicle environment, it is desirable for the models to be deployed efficiently since the decision-making of these vehicles tends to be fast as the vehicle follows a route on the road. Since the conditions of the environment are constantly changing, the model to be used should adapt to all these changes. This raises further considerations, including but not limited to the following: (1) having continuous deployment of good models along a route traversed by a mobile edge node; and (2) smooth training for robust models given the particular sub-region that the mobile edge device is in (e.g., different sub-regions might have differences in their data distribution).

B. Overview of Aspects of an Example Embodiment

B.1. Introduction

Technical problems can exist in scenarios where mobile edge devices can be used, such as but not limited to self-driving connected vehicles, which collect substantial amounts of heterogeneous data to navigate long distances where the network can vary along the way. In these scenarios, the autonomous vehicle would have to adapt to different conditions in the route such as new weather or traffic distributions, requiring communication between a central server and the edge node in question.

Conventional hybrid solutions using merely Federated Learning could tackle this technical problem if there were no network restrictions in some geographic regions. Network usage is an important point to the efficiency of the communication between the central server and the edge nodes.

In contrast, and leveraging the advantage of working in scenarios with network restriction, disclosed herein are techniques using Gossip Learning together with a central server to deploy the best possible model available in the region of the edge node since it demands lower bandwidth.

Additionally, since example embodiments perform Gossip Learning training only among nodes under the same tree node in a given quad-tree, and each of them represents a geographical cluster (recognizing that the data distribution tends to resemble one another across client nodes), the disclosed techniques are able to obtain specialized models for each sub-region, achieving better model performance while sparing bandwidth resources.

Advantages of the present hybrid solution include, but are not limited to, the following:
- An efficient data structure is provided that stores geographical clusters containing the edge node
- The present solution is scalable and robust to dropouts by removing a conventional single point of failure between edge node communications
- The disclosed techniques are performance robust because the present solution clusters the edge nodes by region periodically and receives the model from the list of best models that were created for each region.

B.2. Technical Solutions

Example embodiments address the technical problems discussed in Section A.3 using an efficient hybrid Federated Learning (FL)/Gossip Learning (GL) solution. In some implementations, the present solution leverages GL to offer continuous clustered training of different ML models. The present solution also leverages Federated Learning to provide centralized orchestration of model deployment.

In example embodiments, the environment underlying the present solution is of mobile edge devices spread across 2D space (e.g., geolocation). These mobile edge devices are configured to perform Gossip Learning among themselves. Periodically, some of these mobile devices might want to traverse a longer route. The disclosed solution includes a method to efficiently serve the best model per sub-region to a mobile edge node traversing a route.

FIG. 1A shows aspects of an example hybrid system 100, in accordance with illustrative embodiments. In particular, FIG. 1A illustrates the hybrid system configured for ML model training and deployment to mobile edge devices.

In example embodiments, the service 102 can implement the present hybrid techniques. As used herein, the term "service" refers to an automated program that is tasked with performing different actions based on input. In some cases, the service can be a deterministic service that operates fully given a set of inputs and without a randomization factor. In other cases, the service can be or can include a ML or artificial intelligence engine. The ML engine enables the service to operate even when faced with a randomization factor.

As used herein, reference to any type of machine learning or artificial intelligence may include any type of machine learning algorithm or device, artificial neural network(s), convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) (SVM), artificial intelligence device(s), or any other type of intelligent computing system. Any amount of training data may be used (and perhaps later refined) to train the machine learning algorithm to dynamically perform the disclosed operations. As discussed in further detail herein, example training data can include, but is not limited to, collected input data such as sensor data from self-driving connected vehicles or other mobile edge devices.

In some implementations, the service 102 is a cloud service operating in a cloud environment. In some implementations, the service is a local service operating on a local device, such as a server. In some implementations, the service is a hybrid service that includes a cloud component operating in the cloud and a local component operating on a local device. These two components can communicate with one another.

Some implementations of the hybrid system 100 include a pipeline having multiple phases. Example embodiments of the hybrid system are configured to efficiently serve the best model per sub-region to a mobile edge node traversing a route. An example first phase 104 includes efficient edge node indexing for sub-regions. An example second phase 106 includes selection of a best model per sub-region. An example third phase 108 includes sub-region model serving. Each phase is discussed in further detail herein.

Figure 1B:
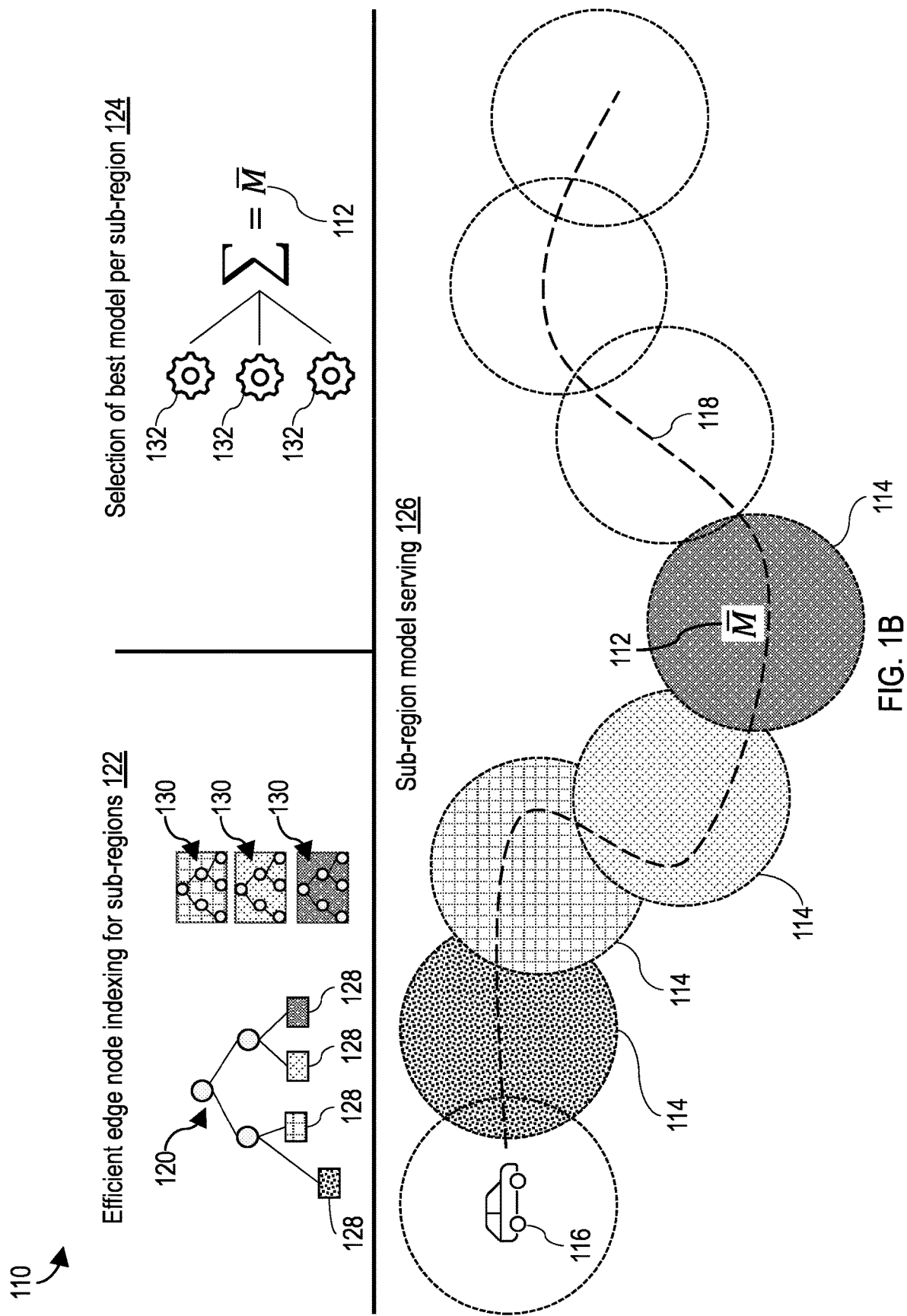

FIG. 1B shows aspects of an example hybrid system 110, in accordance with illustrative embodiments. In some implementations, the hybrid system 110 is an example of the hybrid system 100 (FIG. 1A). FIG. 1B illustrates an overview of select components and phases of the present solution.

Example embodiments set up a Gossip Learning environment, where nodes 116 are periodically clustered according to geographical position. This clustering is done through an efficient data structure, such as a quad-tree 120. When a node decides to follow a long route 118, where "long" can be a predefined threshold, the node sends that route to the central server. The central server is configured to compute the best list of models to be gradually deployed along that route. That is, as the mobile client node traverses different regions 114, the node is able to use the most adequate model 112 for that given region.

In example embodiments, the hybrid system 100 provides efficient edge node indexing 122 for sub-regions. In some implementations, providing efficient edge node indexing is an example of the first phase 104 (FIG. 1A). In some implementations, the indexing leverages a quad-tree 120. The quad-tree is a data structure that provides efficient sub-region splitting 128. In some implementations, the indexing leverages a heapsort 130 per sub-region 128. The heapsort is a data structure that sorts model metrics for a given sub-region.

In example embodiments, the hybrid system 100 selects 126 a best model 112 per sub-region. In some implementations, selecting 124 the best model per sub-region is an example of the second phase 106 (FIG. 1A). As discussed, in example embodiments each sub-region has models 132 associated with that sub-region. Each model has corresponding model metrics. In some implementations, the hybrid system is configured to compute an average model 112 among the best models 132.

In example embodiments, the hybrid system 100 efficiently serves 126 the best models 112 per sub-region 114 to a mobile edge node 116 traversing a route 118. In some implementations, serving 126 the best models per sub-region is an example of the third phase 108 (FIG. 1A). In example embodiments, the mobile edge node seeks a route and a central server provides the best average model per sub-region.

C. Detailed Description of Aspects of an Example Embodiment

C.1. Efficient Edge Node Indexing for Sub-Regions

Figure 2:
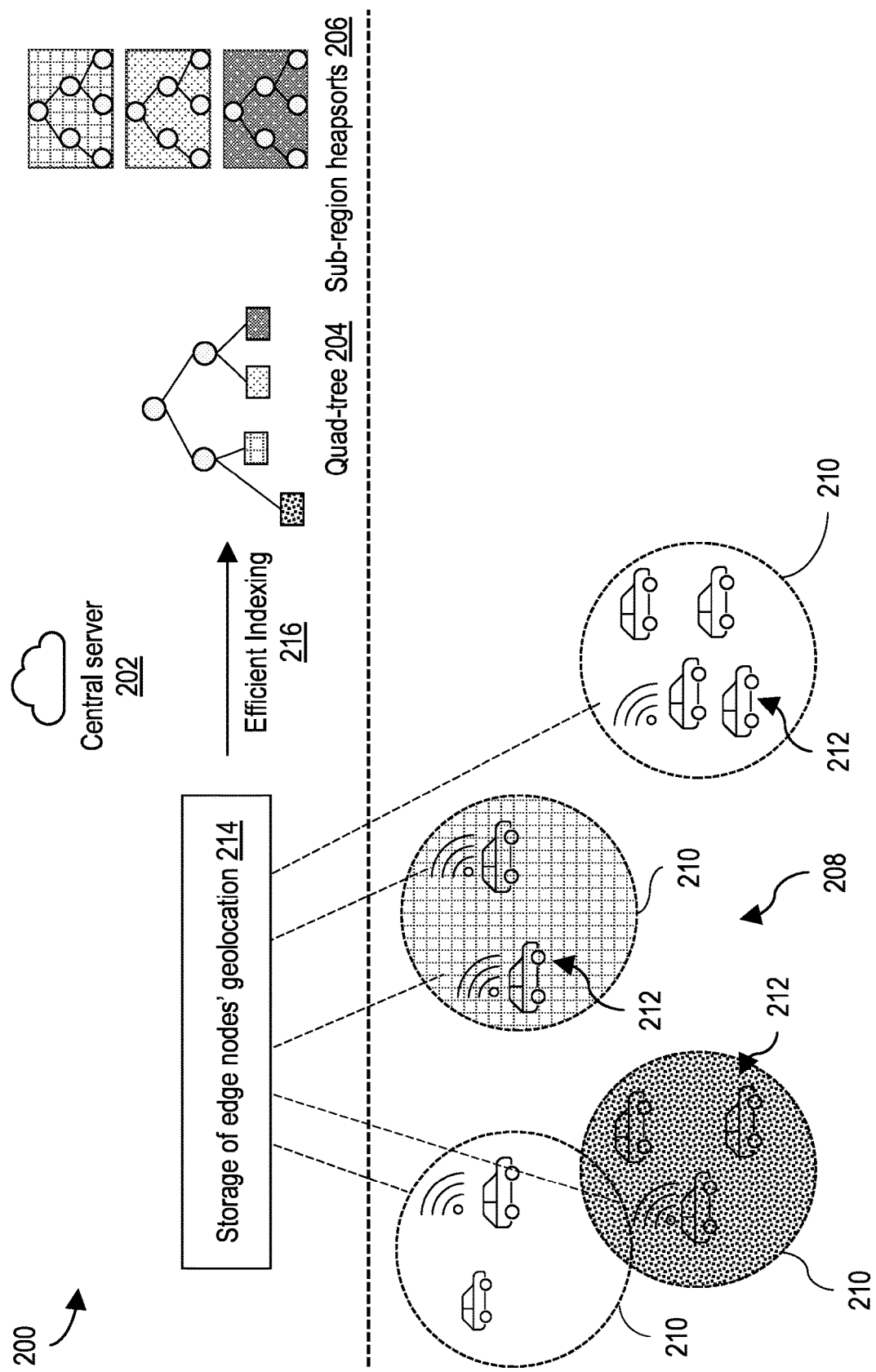
FIG. 2 discloses aspects of example efficient indexing, in accordance with illustrative embodiments.

FIG. 2 shows aspects of example efficient indexing 200, in accordance with illustrative embodiments. In particular, FIG. 2 illustrates example efficient edge node and model indexing.

In one implementation, the present system leverages multiple data structures for indexing models at the central server 202, including a quad-tree 204 and a heapsort 206.

In example embodiments, the first data structure is a quad-tree 204. In some implementations, the quad-tree is responsible for efficiently dividing the known geolocation 2D space 208 into sub-regions 210 according to the average number of nodes 212 that are present at each sub-region (for example, for a given window of time). These sub-regions are also sometimes referred to herein as "regions."

In example embodiments, the second data structure is a heapsort 206. In some implementations, the heapsort is configured to index models, and corresponding model metrics, for each sub-region 210.

In some implementations, the indexing 200 performs periodic gathering and storage 214 of edge nodes' geolocation. The sub-regions 210 are defined by constructing a quad-tree 204, as described in further detail herein. Each sub-region uses an associated heapsort 206 for efficient metric indexing. In example embodiments, the combination of the quad-tree and the heapsort allows for efficient indexing 216 of sub-regions' models' metrics. More particularly, for each sub-region, the indexing results in the models being sorted according to a model metric.

C.1.1. Quad-Tree Construction

In example embodiments, at each pre-defined interval and for a pre-defined time window, the central server 202 is configured to gather geolocation information from each available edge node 212. In some implementations this geolocation information can be stored centrally 214, for example associating each edge node ID with a 2D geolocation.

Since example embodiments deal with mobile edge nodes 212, in some implementations the gathering of geolocations happens through a pre-specified period, where multiple geolocations are gathered for each edge node. In example embodiments, for each edge node, the present techniques first calculate a centroid of geolocations for the edge node and the standard deviation in both 2D directions. If the spreading of that node around space (as given by, for example, the standard deviation) is low enough (for example, according to a predetermined threshold), then the present techniques consider the average location as the point associated with that edge node to be used by the quad-tree 204.

In example embodiments the quad-tree 204 construction then proceeds as typical, which results in partitioning the 2D space 208 into regions 210 and storing the edge node IDs associated with each region. Advantageously, this quad-tree enables use of an efficient data structure to query for all edge nodes 212 that are expected to be located at a particular region. The quad-tree can be updated at each pre-defined interval, which can be set by a subject matter expert given the available resources and expected mobility of edge nodes.

C.1.2. Heapsort Construction

In one implementation, the present system is configured to leverage, jointly with the quad-tree 204, heapsort 206 data structures to associate each sub-region 210 to the sorted model metrics for all known models of that sub-region (by a given chosen model metric, e.g., validation accuracy). In some embodiments these heapsort structures can also be updated at pre-defined time intervals set by a subject matter expert on the particular domain. Advantageously, the heapsort enables the present solution to have an efficient way of querying for the best performing models of a given region (for example, using a predetermined threshold for a given metric value).

C.2. Selection of Best Models Per Sub-Region

Figure 3:
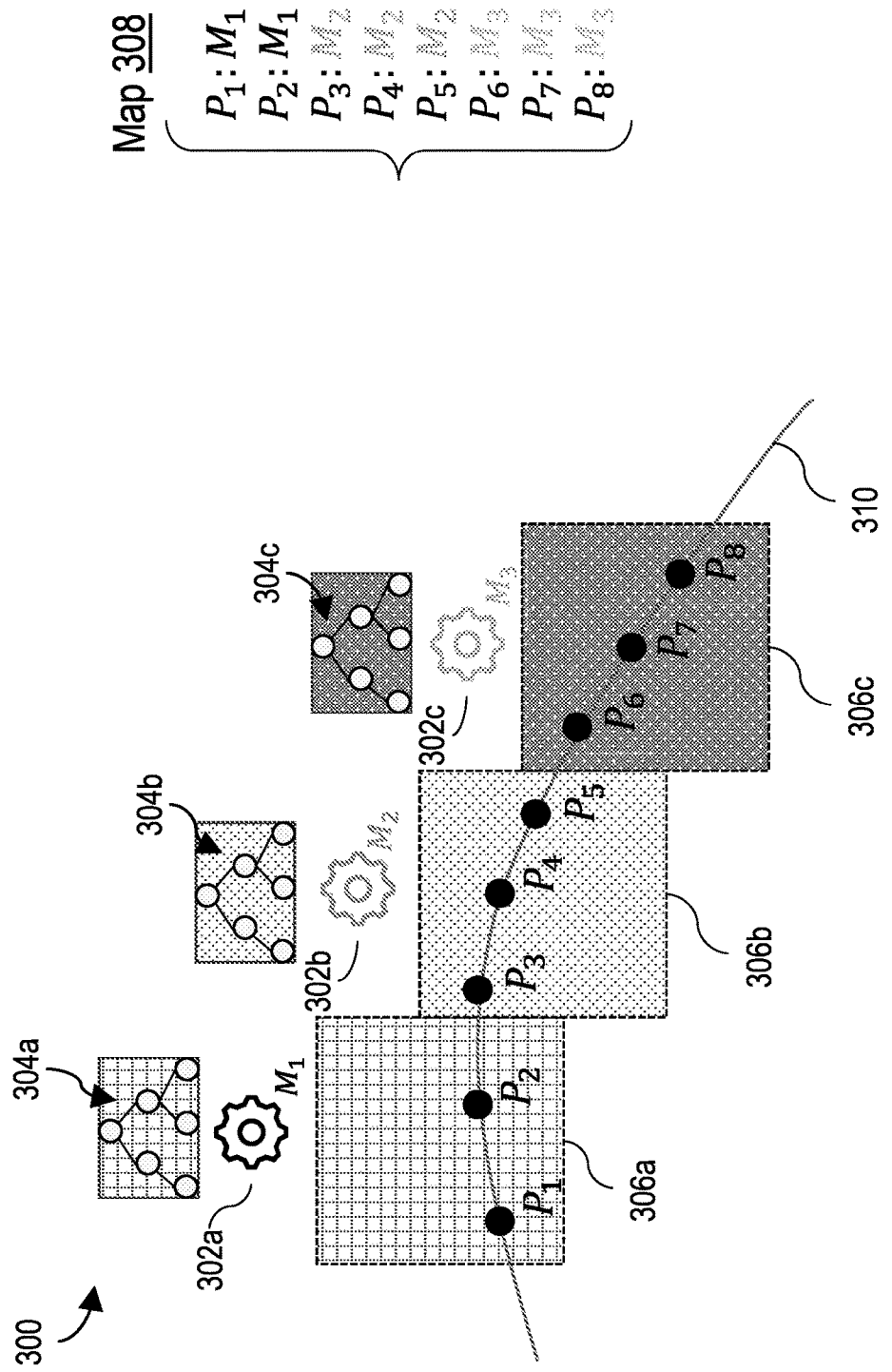
FIG. 3 discloses aspects of example model selection per sub-region, in accordance with illustrative embodiments.

FIG. 3 shows aspects of example selection 300 of best models per sub-region, in accordance with illustrative embodiments.

In example embodiments, one aspect of the disclosed techniques includes efficiently serving a good candidate model per sub-region. To do this, example embodiments index good models 302a, 302b, 302c (collectively, the models 302), as discussed in Section C.1. From the constructed quad-tree, the present solution is able to derive efficiently the edge nodes likely to be in each region (illustrated in FIG. 3 by the points $P_1$ through $P_8$). From the heapsorts 304a, 304b, 304c (collectively, the heapsorts 304), the present solution is able to infer efficiently the best models 302a, 302b, 302c per sub-region 306a, 306b, 306c (collectively, the sub-regions 306). In some implementations, an example output includes a map 308 from the points $P_1$ through $P_8$ to the best model 302 in the sub-region 306 of a route 310.

In example embodiments, the central server receives a route 310 from the mobile edge node looking to traverse a route and then computes the following: (1) the sub-regions 306 that intersect the route; and (2) the best models 302 per intersecting sub-region.

In one implementation, to compute the intersecting sub-regions (1), the hybrid solution can efficiently query the currently constructed quad-tree to arrive at the intersecting sub-regions.

In one implementation, to compute the best models per sub-region (2), the hybrid solution can consult the heapsorts 304 associated with the intersecting sub-regions and from each heapsort, query the top-performing model 302. The central server then constructs a dictionary 308 that maps from a point along the route, for example $P_1$ through $P_8$, to a best-performing model (for example, edge node ID) for that point. In some implementations this mapping is done by associating a model to a point whenever that model is the best model for the sub-region containing that point.

As mentioned, the "best" model refers to choosing an acceptable or appropriate model from those obtained based on various performance metrics. Although the present disclosure generally refers to a given "best" or "top-performing" model for ease of illustration, the ranked models are also referred to herein as "high-performing," "recommended," "appropriate," "good," and "adequate," without departing from the scope of the example embodiments.

C.3. Sub-Region Model Serving

C.3.1. Serving

Figure 4:
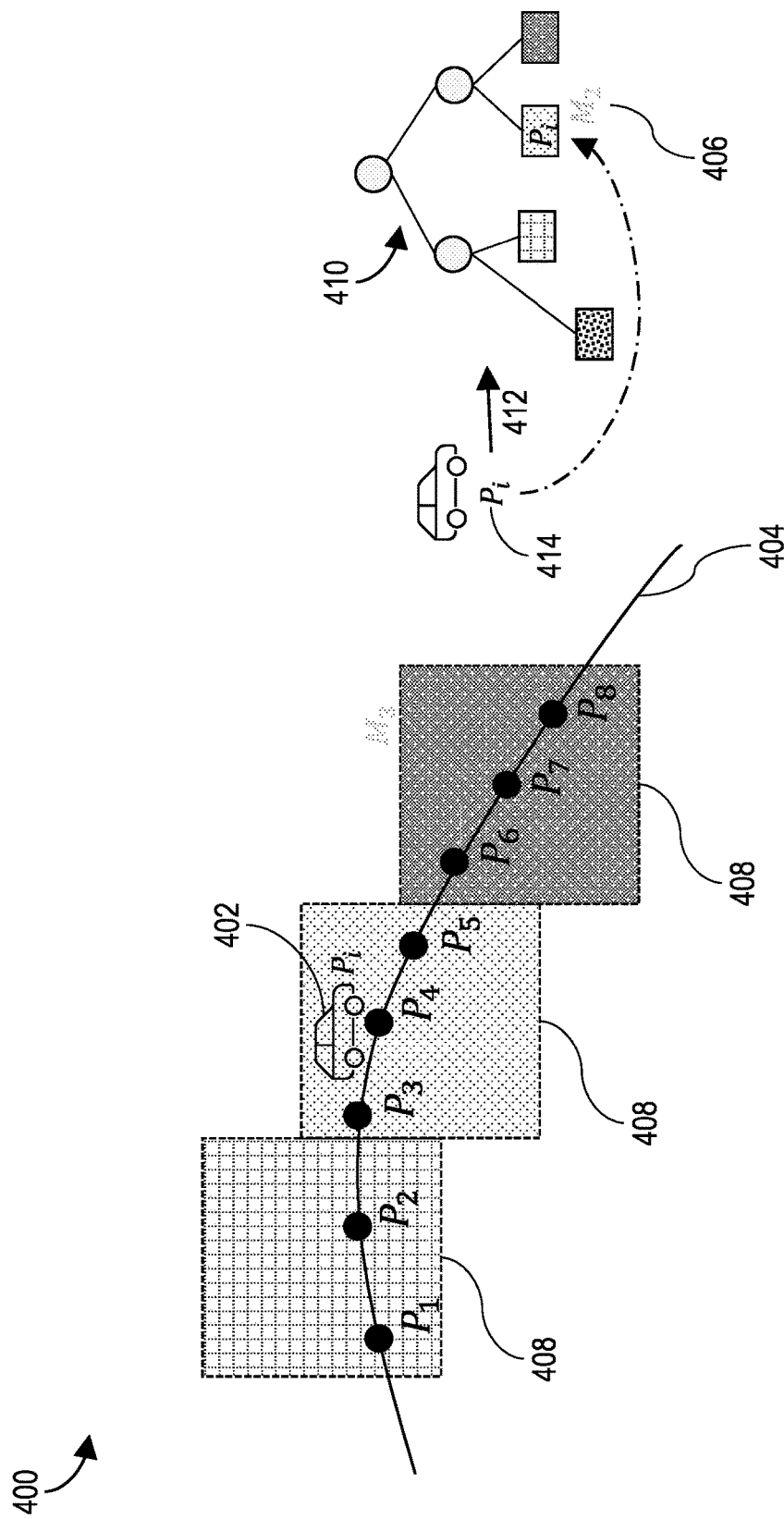
FIG. 4 discloses aspects of example sub-region model serving, in accordance with illustrative embodiments.

FIG. 4 shows aspects of example sub-region serving 400, in accordance with illustrative embodiments. In particular, FIG. 4 illustrates example operation of the present hybrid solution once a given mobile edge node 402 commits on a route 404.

In example embodiments, once the mobile edge node 402 commits on a route 404, the present solution is configured to serve the mobile edge node the best model 406 for each sub-region 408 that the mobile edge node traverses. Some implementations leverage the efficient data structures previously built to query for the best model given the current point along the route on which model is on. In example embodiments, the mobile edge node is configured to store the quad-tree 410 communicated by the central server, and then query 412 the quad-tree for the current geolocation 414 of the mobile edge node. In alternate embodiments, the mobile edge node is configured store a map from points to best models, and then compute the distance from the mobile edge node to all known points to arrive at the closest one and thus the best model. In some implementations the choice of embodiment depends on the computational and storage resources available for the mobile edge node.

In example embodiments, when the mobile edge node 402 has computed the best model 406 required for its current geolocation 414, the mobile edge node can request the central server for that model. In alternate embodiments, if network restrictions are high (for example, above a predetermined threshold), the mobile edge node can request the model directly from a corresponding edge node that has the model. In some implementations this information can be stored locally in a lightweight data structure (for example, provided by the central server) mapping from each best model to the last edge node that had the particular model. This design leverages an approach in which the best model for a given sub-region contains a balanced mix of all the models from edge nodes that are performing Gossip Learning at that sub-region.

C.3.2. Training

Figure 5:
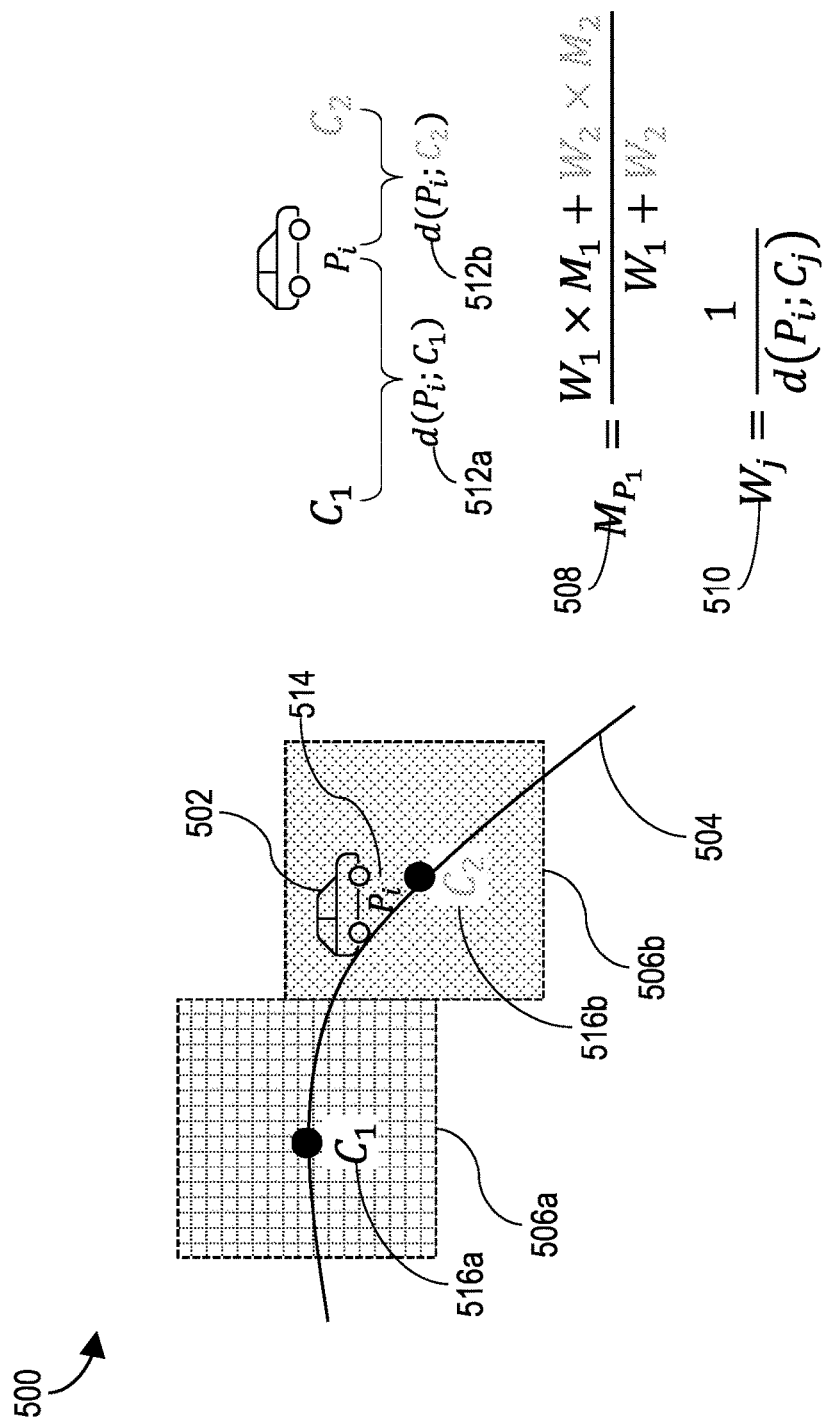
FIG. 5 discloses aspects of example sub-region model training, in accordance with illustrative embodiments.

FIG. 5 shows aspects of example sub-region training 500, in accordance with illustrative embodiments. Particularly, in example embodiments if the mobile edge device 502 is set to perform training along the route 504, the present hybrid solution is operable to merge the models associated with the sub-regions 506a, 506b (collectively, sub-regions 506) that the mobile edge device is traversing.

Some implementations of this merging can use weighted averaging 508. Particularly, in example embodiments, at any given time that the mobile edge device 502 wants to perform a new model merge, the mobile edge device merges the previous best model with the next best model. In some implementations this merge is done by weighing 510 the merge using the distance 512a, 512b (collectively, distances 512) from the current geolocation 514 of the mobile edge device to both the center 516a of the previous region and the center 516b of the current region 506b that the mobile edge device is in. Advantageously, this approach allows a smooth transition between models as the mobile edge device traverses different sub-regions 506a, 506b that might exhibit possible differences in data distribution.

D. Example Methods

Figure 6:
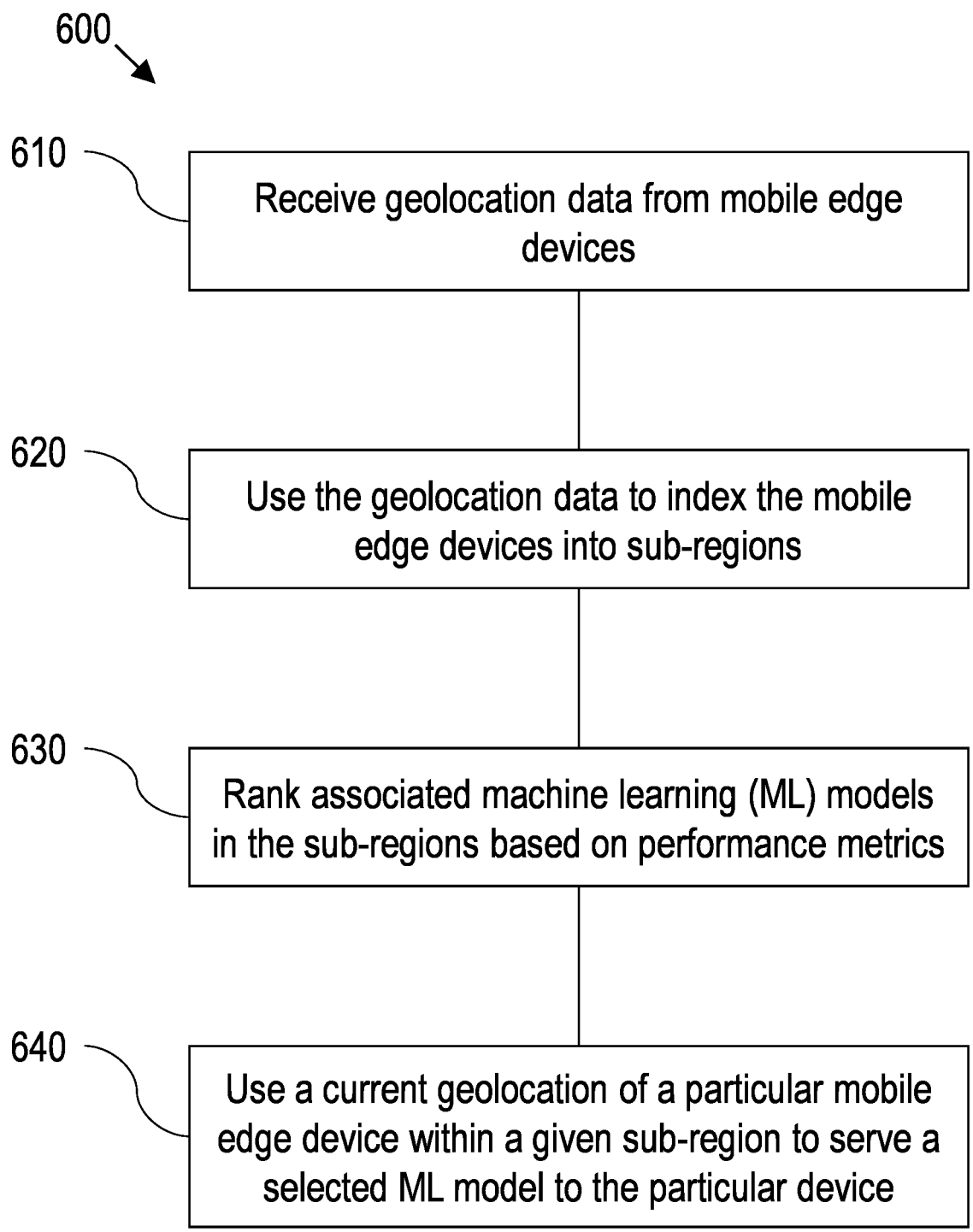
FIG. 6 discloses a flowchart of an example method, in accordance with illustrative embodiments.

FIG. 6 shows a flowchart of an example method 600, in accordance with illustrative embodiments. In example embodiments, the method 600 allows for hybrid ML model training and deployment to mobile edge devices.

In some embodiments, the method 600 can be performed by the hybrid solution 100, such as using the service 102. In some implementations, the hybrid solution includes a central server equipped with a memory and a processor, and the central server and mobile edge devices are configured to operate in a hybrid Federated Learning and Gossip Learning environment that enables continuous clustered training and centralized orchestration of model deployment.

In example embodiments, the method 600 includes receiving geolocation data from mobile edge devices (step 610). In some embodiments, the mobile edge devices are configured to request and receive ML models from a central server or directly from peer devices in the hybrid Federated Learning and Gossip Learning environment based on network connectivity and restrictions. In some embodiments, the mobile edge devices include self-driving vehicles configured to collect heterogeneous data and to leverage continuous model serving and efficient deployment of ML models so as to adapt to varying conditions along a route.

In example embodiments, the method 600 includes using the geolocation data to index the mobile edge devices into sub-regions (step 620). In some embodiments, the sub-regions are determined using a quad-tree data structure. In some embodiments, the method further includes updating the quad-tree data structure periodically based on the geolocation data. In further embodiments, the method further includes computing a centroid of geolocations for the mobile edge devices, where the mobile edge devices are indexed using the centroid and the quad-tree data structure if a standard deviation of the geolocations is below a predefined threshold. In some embodiments, the mobile edge devices are configured to perform Gossip Learning by exchanging and updating ML models with peer devices within the same sub-region. In some embodiments, the mobile edge devices are configured to perform weighted averaging of the ML models based on current geolocations of the devices relative to centers of the sub-regions that the devices traverse.

In example embodiments, the method 600 includes ranking associated ML models in the sub-regions based on performance metrics (step 630). In some embodiments, the ML models are ranked using one or more heapsort data structures associated with the sub-regions. In further embodiments, the method further includes constructing and updating the heapsort data structures with new ML models and corresponding performance metrics of the new ML models. In still further embodiments, the method includes providing a list of high-performing ML models for a route traversed by a particular mobile edge device, where the ML models are included in the list based on the performance metrics of the ML models in the sub-regions of the route. In some embodiments, the performance metrics include at least validation accuracy of the machine learning models.

In example embodiments, the method 600 includes using a current geolocation of a particular mobile edge device within a given sub-region to serve a selected ML model to the particular device (step 640). In some embodiments the ML model to serve can be selected based on the performance metrics of the selected ML model within the given sub-region.

In some embodiments, the method 600 further includes providing a weighted merge of the ML models associated with the sub-regions to facilitate smooth transitions between ML models for a particular mobile edge device as the device traverses different sub-regions.

While the various steps in the example method 600 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is noted with respect to the example method 600 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

E. Processing Platform

At least portions of the present hybrid system can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the present hybrid system. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIG. 7. Although described in the context of the present hybrid system, these platforms may also be used to implement at least portions of other information processing systems in other embodiments.

Figure 7:
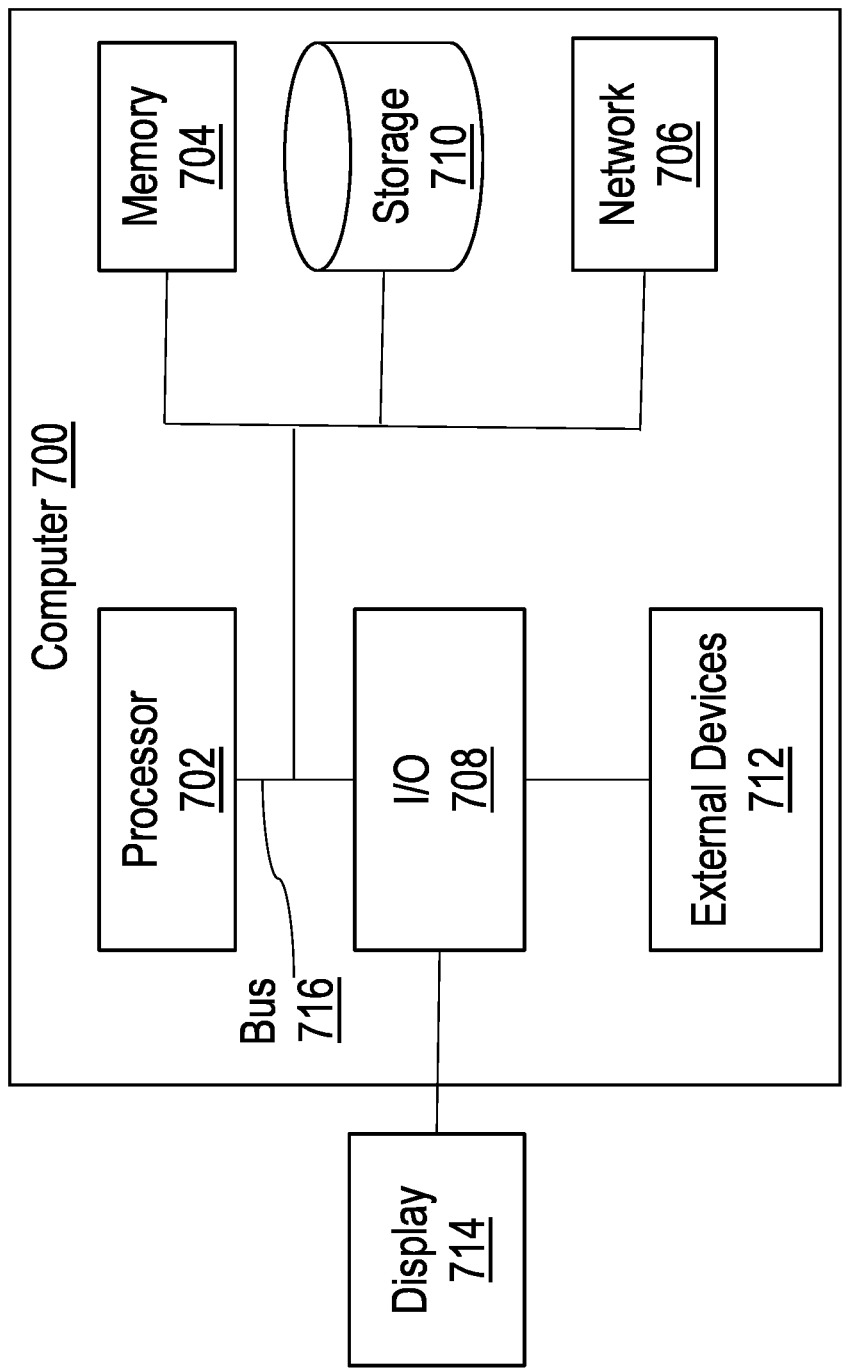
FIG. 7 discloses aspects of a computing entity configured and operable to perform any of the disclosed methods, processes, and operations, in accordance with illustrative embodiments.

FIG. 7 illustrates aspects of a computing device or a computing system in accordance with example embodiments. The computer 700 is shown in the form of a general-purpose computing device. Components of the computer may include, but are not limited to, one or more processors or processing units 702, a memory 704, a network interface 706, and a bus 716 that communicatively couples various system components including the system memory and the network interface to the processor.

The bus 716 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 700 typically includes a variety of computer-readable media. Such media may be any available media that is accessible by the computer system, and such media includes both volatile and non-volatile media, removable and non-removable media.

The memory 704 may include computer system readable media in the form of volatile memory, such as random-access memory (RAM) and/or cache memory. The computer system may further include other removable/non-removable, volatile/non-volatile computer system storage media. By way of example only, the storage system 710 may be provided for reading from and writing to a non-removable, non-volatile magnetic media (not shown and typically called a "hard drive") in accordance with the present hybrid techniques. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 716 by one or more data media interfaces. As has been depicted and described above in connection with FIGS. 1A-6, the memory may include at least one computer program product having a set (e.g., at least one) of program modules that are configured to carry out the functions of the embodiments as described herein.

The computer 700 may also include a program/utility having a set (at least one) of program modules, which may be stored in the memory 704 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 700 may also communicate with one or more external devices 712 such as a keyboard, a pointing device, a display 714, etc.; one or more devices that enable a user to interact with the computer system; and/or any devices (e.g., network card, modem, etc.) that enable the computer system to communicate with one or more other computing devices. Such communication may occur via the Input/Output (I/O) interfaces 708. Still yet, the computer system may communicate with one or more networks such as a local area network (LAN), a general wide area network (WAN), and/or a public network (e.g., the Internet) via the network adapter 706. As depicted, the network adapter communicates with the other components of the computer system via the bus 716. It should be understood that although not shown, other hardware and/or software components could be used in conjunction with the computer system. Non-limiting examples include microcode, device drivers, redundant processing units, external disk drive arrays, RAID systems, tape drives, data archival storage systems, and the like.

It is noted that embodiments of the invention, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

In the foregoing description of FIGS. 1A-7, any component described with regard to a figure, in various embodiments of the invention, may be equivalent to one or more like-named components described with regard to any other figure. For brevity, descriptions of these components has not been repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the disclosure, ordinal numbers (e.g., first, second, third, etc.) may have been used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Throughout this disclosure, elements of figures may be labeled as "a" to "n". As used herein, the aforementioned labeling means that the element may include any number of items and does not require that the element include the same number of elements as any other item labeled as "a" to "n." For example, a data structure may include a first element labeled as "a" and a second element labeled as "n." This labeling convention means that the data structure may include any number of the elements. A second data structure, also labeled as "a" to "n," may also include any number of elements. The number of elements of the first data structure and the number of elements of the second data structure may be the same or different.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the embodiments described herein should be limited only by the appended claims.

What is claimed is:

1. A system comprising:
a memory comprising instructions; and
a processor communicatively coupled to the memory and configured to execute the instructions, the instructions comprising:
receiving geolocation data from mobile edge devices;
using the geolocation data to index the mobile edge devices into sub-regions, wherein the sub-regions are determined using a quad-tree data structure;
computing a centroid of geolocations for the mobile edge devices, wherein the mobile edge devices are indexed using the centroid and the quad-tree data structure if a standard deviation of the geolocations is below a predefined threshold;
ranking associated machine learning (ML) models in the sub-regions based on performance metrics; and using a current geolocation of a particular mobile edge device within a given sub-region to serve a selected ML model to the particular device, wherein the ML model to serve is selected based on the performance metrics of the selected ML model within the given sub-region.

2. The system of claim 1, further comprising a central server equipped with the memory and the processor, wherein the central server and the mobile edge devices are configured to operate in a hybrid Federated Learning and Gossip Learning environment that enables continuous clustered training and centralized orchestration of model deployment.

3. The system of claim 2, wherein the mobile edge devices are configured to request and receive ML models from the central server or directly from peer devices in the hybrid Federated Learning and Gossip Learning environment based on network connectivity and restrictions.

4. The system of claim 1, wherein the ML models are ranked using one or more heapsort data structures associated with the sub-regions.

5. The system of claim 1, wherein the performance metrics include at least validation accuracy of the machine learning models.

6. The system of claim 1, wherein the instructions further comprise:
providing a weighted merge of the ML models associated with the sub-regions to facilitate smooth transitions between ML models for a particular mobile edge device as the device traverses different sub-regions.

7. The system of claim 1, wherein the mobile edge devices are configured to perform Gossip Learning by exchanging and updating ML models with peer devices within a same sub-region.

8. The system of claim 1, wherein the mobile edge devices are configured to perform weighted averaging of the ML models based on current geolocations of the devices relative to centers of the sub-regions that the devices traverse.

9. The system of claim 1, wherein the mobile edge devices include self-driving vehicles configured to collect heterogeneous data and to leverage continuous model serving and efficient deployment of ML models so as to adapt to varying conditions along a route.

10. A method comprising:
receiving geolocation data from mobile edge devices;
using the geolocation data to index the mobile edge devices into sub-regions, wherein the sub-regions are determined using a quad-tree data structure;
updating the quad-tree data structure periodically based on the geolocation data;
ranking associated ML models in the sub-regions based on performance metrics, wherein the ML models are ranked using one or more heapsort data structures associated with the sub-regions;
constructing and updating the heapsort data structures with new ML models and corresponding performance metrics of the new ML models;
providing a list of high-performing ML models for a route traversed by a particular mobile edge device, wherein the ML models are included in the list based on the performance metrics of the ML models in the sub-regions of the route; and
using a current geolocation of a particular mobile edge device within a given sub-region to serve a selected ML model to the particular device, wherein the ML model to serve is selected based on the performance metrics of the selected ML model within the given sub-region.

11. The method of claim 10, wherein the performance metrics include at least validation accuracy of the machine learning models.

12. The method of claim 10, further comprising:
providing a weighted merge of the ML models associated with the sub-regions to facilitate smooth transitions between ML models for a particular mobile edge device as the device traverses different sub-regions.

13. The method of claim 10, wherein the mobile edge devices are configured to perform weighted averaging of the ML models based on current geolocations of the devices relative to centers of the sub-regions that the devices traverse.

14. The method of claim 10, further comprising:
gathering geolocation data from each available mobile edge device for a predetermined time window;
storing the geolocation data centrally by associating an edge device identifier for a particular mobile edge device with a corresponding geolocation; and
using the geolocation data to determine a plurality of geolocations for each mobile edge device during the predetermined time window.

15. The method of claim 10, further comprising:
determining sub-regions that intersect a route received from a particular mobile edge device;
querying heapsort data structures associated with the intersecting sub-regions to determine the list of high-performing models to provide; and
constructing a mapping that associates points along the route with high-performing models corresponding to the associated points.

16. The method of claim 10, further comprising:
merging a previous high-performing ML model with a next high-performing ML model when a given mobile edge device performs a new model merge; and
weighting the model merge using distances from a current geolocation of the mobile edge device to both a previous region of the mobile edge device and a current region of the mobile edge device.

17. The method of claim 10, wherein when network restrictions exceed a predetermined threshold, the mobile edge device is configured to:
construct a mapping from each particular high-performing model to a last mobile edge device that had the particular high-performing model; and
request the particular high-performing model directly from the corresponding mobile edge device that has the particular high-performing model.

18. A non-transitory processor-readable storage medium having stored thereon program code of one or more software programs, wherein the program code when executed by at least one processing device causes the at least one processing device to perform the following steps:
receiving geolocation data from mobile edge devices;
using the geolocation data to index the mobile edge devices into sub-regions, wherein the sub-regions are determined using a quad-tree data structure;
computing a centroid of geolocations for the mobile edge devices, wherein the mobile edge devices are indexed using the centroid and the quad-tree data structure if a standard deviation of the geolocations is below a predefined threshold;
ranking associated ML models in the sub-regions based on performance metrics; and
using a current geolocation of a particular mobile edge device within a given sub-region to serve a selected ML model to the particular device, wherein the ML model to serve is selected based on the performance metrics of the selected ML model within the given sub-region.

19. The non-transitory processor-readable storage medium of claim 18,
wherein the mobile edge devices are periodically clustered according to the geolocation data, and
wherein when a mobile edge device decides to follow a route exceeding a predetermined threshold length, the mobile edge device is configured to send the route to a central server to determine a list of high-performing models to be deployed gradually along the route.

20. The non-transitory processor-readable storage medium of claim 18,
wherein the quad-tree data structure is received by the mobile edge device from a central server; and
wherein the mobile edge device is configured to:
query the quad-tree data structure for a current geolocation of the mobile edge device; and
request a high-performing model for the current geolocation of the mobile edge device from either the central server or directly from a corresponding mobile edge device based on network restrictions.

* * * * *